Sept. 4, 1956  F. A. VAN VOOREN  2,761,601
AIR INFLATING DEVICE FOR TIRES
Filed Aug. 21, 1953
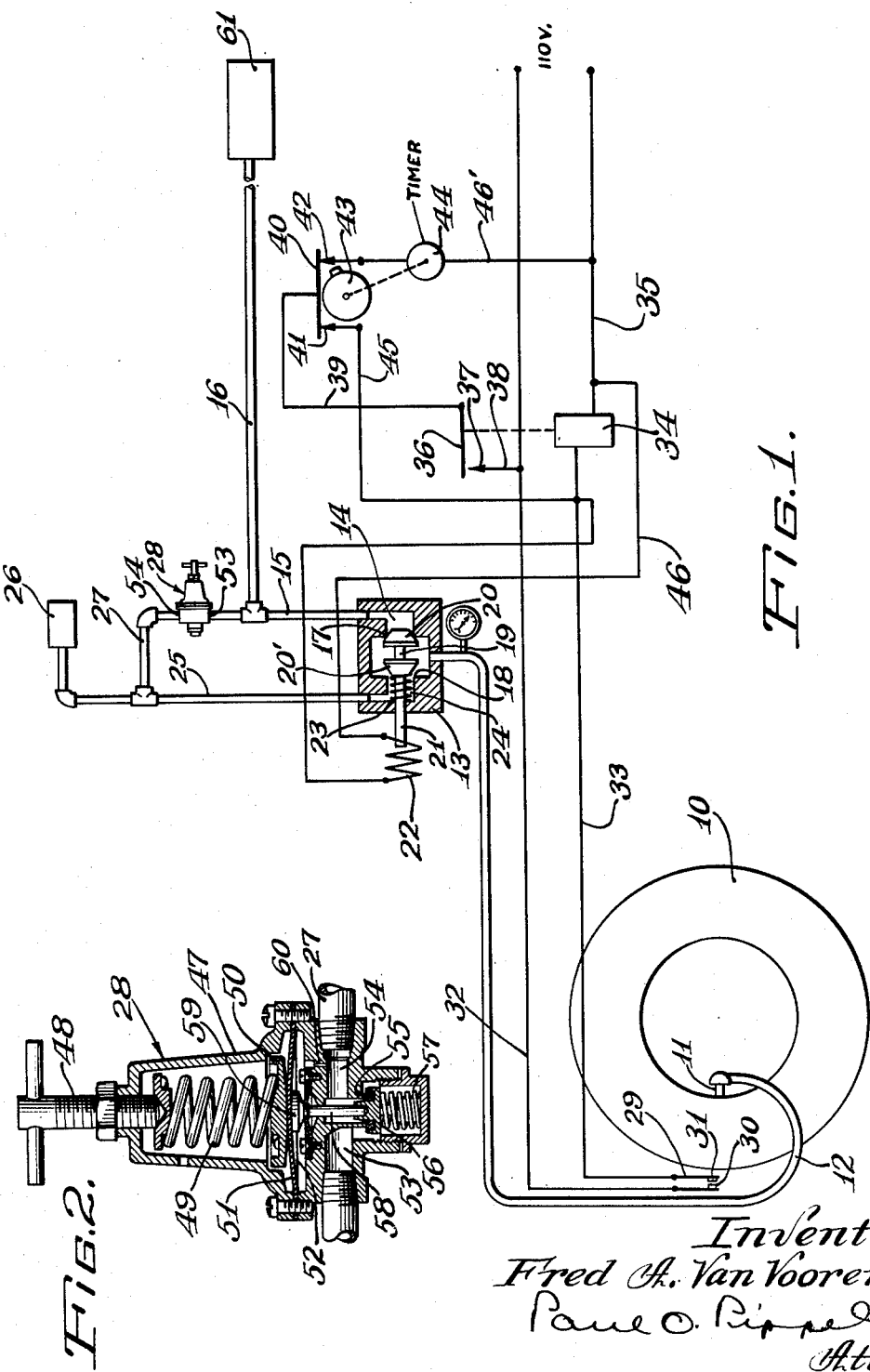
Inventor:
Fred A. Van Vooren
Paul O. Pippel
Atty.

United States Patent Office 2,761,601
Patented Sept. 4, 1956

2,761,601
AIR INFLATING DEVICE FOR TIRES
Fred A. Van Vooren, Moline, Ill.

Application August 21, 1953, Serial No. 375,752

7 Claims. (Cl. 226—20.6)

This invention relates to an improved inflating system for inflating objects to a predetermined air pressure. More specifically, the device relates to an inflating system particularly adapted to inflate tires, the device including control means adapted to control air pressure within a predetermined range.

It is a prime object of this invention to provide an improved inflating system for inflating tires and the like, the system having control means adapted to automatically regulate the air pressure within the tire so that one operator can supervise a plurality of these systems for filling tires on a production basis.

Still another object is to provide an improved air inflating device including a timing mechanism operable to sever connection between an object to be inflated and the source of air pressure, after a predetermined time delay, the system also including automatic means operable to relieve overinflation of the object.

A still further object is to provide an improved inflating system for inflating tires and the like, the system including means automatically operable to sever connection between the tire and a source of air under pressure after a predetermined lapse of time, and including a pressure relief valve operable to release pressure from the tire during over-inflation, the tire also being connected to the source of pressure by means of a pressure regulator adapted to automatically bring the tire pressure up to the predetermined degree when the same is underinflated.

These and further objects will become more readily apparent from a reading of the specification when examined in connection with the accompanying sheet of drawing.

In the drawing:

Figure 1 is a diagrammatic view of an improved air inflating system including electrical control means therefor, and Figure 2 is a cross-sectional view through a pressure regulator used in connection with the system shown in Figure 1.

Referring now particularly to Figure 1, an object to be inflated, such as a tire, is generally indicated by the reference character 10. The tire 10 includes an air inlet stem 11 to which a flexible air hose 12 is connected. The air hose 12 is connected to a valve casing 13 having therein a passage 14 connected by means of a conduit 15 to a pressure conduit or line 16. The passage 14 terminates at one end in a valve seat 17. Diametrically opposite to the valve seat 17 is a valve seat 18, the said valve seats 17 and 18 being adapted to be opened and closed by means of a spool valve 19. The spool valve 19 comprises axially spaced valve elements 20 and 20'. The valve elements 20 and 20' are respectively adapted to engage valve seats 17 and 18. A stem 21 is connected to the spool valve 19, the said stem 21 being disposed within a solenoid 22. The solenoid 22 may be of conventional construction for moving the valve element 20' into engagement with the valve seat 18, whereupon the valve element 20 is displaced from the valve seat 17 and the passage 14 may communicate with the air hose 12.

A spring 23 is disposed within a passage 24 of the casing 13, the spring 23 normally urging the valve element 20 into engagement with the valve seat 17. The passage 24 is in communication with a conduit 25 which is connected to a pressure relief valve, designated 26, and schematically shown. The pressure relief valve 26 may be of conventional construction, being adapted to relieve pressure within the line 25, at a predetermined pressure.

A by-pass conduit 27 is connected to the conduit 25, the by-pass conduit 27 also communicating with the pressure line 16. The by-pass conduit 27 includes a pressure regulator 28, more particularly shown in Figure 2.

A hand actuated switch 29 is positioned adjacent the tire 10. The switch 29 includes contacts 30 and 31. The contact 30 is connected to a wire 32 of a two-wire 110 volt system. The contact 31 is connected to a wire 33 of the system. A relay 34 is connected to the wire 33 and a wire 35 extends from the relay 34 to a suitable source of electricity. A switch arm 36 is adapted to be actuated by the relay 34, the switch arm 36 being adapted to engage a contact 37 connected by means of a wire 38 to the wire 32. A switch element 40 is adapted to be moved into and out of engagement with respect to contacts 41 and 42. A rotating cam 43 is operated by a timer motor 44 for disengaging the arm 40 from contacts 41 and 42. A wire 45 leads from the contact 41 to one side of the solenoid 22. A wire 46 extends from the solenoid 22 and is connected to the line 35 of the 110 volt circuit. The contact 42 and the timer motor 44 are connected by a wire 46' to the wire 35.

The pressure regulator 28 is best shown in the cross-sectional view of Figure 2. The pressure regulator 28 will be generally described since it may be a conventional type of unit. It includes a casing 47 and an adjusting screw 48 adapted to compress a spring 49 within the casing. A spring 49 is connected to a washer 50 which presses downwardly against a diaphragm 51 disposed in a diaphragm chamber 52. The casing 47 includes conduit connections 53 and 54, the conduit connection 54 being adapted to be connected to the load side of the by-pass conduit 27, as indicated in Figure 1. A valve seat 55 is adapted to be opened and closed by means of a valve 56. The valve 56 is normally urged into a closed position by means of a spring 57. A stem 58 is connected to the valve 56, the stem 58 having at its upper end a disc 59 which tends to urge the diaphragm 51 in an upward direction. A port 60 is in communication with the chamber 52 and the conduit connection 54. The pressure conduit 16 is in communication with a source of pressure, generally designated at 61.

It must be understood that a plurality of these systems may be simultaneously supervised by an operator who is engaged in filling or inflating tires on a production basis. Such production inflation is generally accomplished in connection with a vehicle production line wherein the tires are inflated and then assembled on the completed vehicle. It must be understood that only one of the systems has been shown and described and that several or more may be utilized and placed under the supervision of a single operator. In use, the operator presses the contacts 30 and 31 together momentarily and the relay 34 is effective to move the switch arm 36 to engage the contact 37, thus energizing wires 45 and 46 whereupon the solenoid 22 moves the stem 21 to the left so that the valve 20 is moved from the valve seat 17 and the valve 20' is moved into engagement with the valve seat 18. The air-filling conduit or line 12 is now in communication with the passage 14 and the pressure conduit 16 whereupon inflation of the tire takes place. The timer motor 44 is in operation and the cam 43 is rotated and serves to disengage the switch element 40 from the contacts 41 and 42 after a predetermined time interval. Upon disengagement of the switch element 40, the solenoid 22 is no longer energized and the spring 23 serves to move the valve 20 into the closed position with respect to the passage 14. At this point the proper inflation of the tire 10 should have taken place.

The valve 20' is now removed from the valve seat 18 and the passage 24 is in communication with the air line 12. Supposing now that the tire has become overinflated above a 30 pound pressure, the relief valve 26 is now effective to release pressure from the line 25 and air-filling line 12 until the desired degree of pressure is obtained. If, however, the pressure in the tire 10 is below the desired pressure, say at 29½ pounds or less, the regulator 28 is then effective to bring the pressure up to the desired amount. This is accomplished through the by-pass 27 which directs air under pressure from the line 16 to the line 25 and to the air line 12.

The pressure regulator 28 operates in a conventional manner. The pressure connection 54 is connected on the "load" side of the system and thus is connected to the by-pass conduit 27. Thus, the port 60 and the chamber 52 are also in communication with the said by-pass conduit. The unit is so set by means of the adjusting screw 48 that at a figure of 29½ pounds the air pressure within the chamber 52 is effective to assist the spring 57 to keep the valve 56 closed against the action of the spring 49. However, when the pressure in the diaphragm chamber 52 drops below the desired amount, the spring 49 is effective to open the valve 56 whereupon air from the pressure line 16 is directed through the by-pass 27 and to the tire 10 until the pressure within the diaphragm chamber again reaches 29½ pounds. Thus, it can be seen that the pressure regulator is effective to assure that the proper inflation of the tire is accomplished even though the time interval, as determined by the timer, may have resulted in either overinflation or underinflation of the tire.

It can thus be seen that systems of this type may be simultaneously supervised by one operator and assurance is had that each tire is inflated to the proper degree. The system operates simply and effectively and permits the production line filling of tires with a minimum of effort. It can be seen, therefore, that the objects of the invention have been fully achieved and it must be appreciated that changes may be made in the system without departing from the spirit of the invention as disclosed or the scope thereof as defined in the appended claims.

What is claimed is:

1. An air inflating system comprising an air pressure conduit adapted to connect to a source of air under pressure, a valve device having first and second chambers, first and second valve seats respectively adjacent said first and second chambers, a valve plunger including a valve movable alternately into engagement with said first and second valve seats for closing and opening said first and second chambers, means connecting said pressure conduit to provide communication with said first chamber, a filling conduit connected to said valve and being adapted to connect to an object to be inflated, said filling conduit being adapted to alternately communicate with said first and second chambers upon movement of said valve plunger, a pressure release line connected to said second chamber, a pressure release valve connected to said pressure release line, said release valve being operable to release pressure from the object being filled at a predetermined pressure, a by-pass line connecting said pressure release line and said pressure conduit, said by-pass line including a pressure regulator adapted to direct air under pressure to said pressure release line, solenoid means for moving said valve from said first valve seat and for engaging said second valve seat whereby air is directed from the first chamber to said filling conduit, and timing means connected to said solenoid means for actuating the valve to engage said first valve seat to close said first chamber upon a predetermined time interval whereby said second chamber is opened and said pressure release valve and said filling conduit are in communication, said pressure regulator being adapted to direct air from said pressure conduit through said by-pass to said air filling line during a predetermined pressure in the object being filled.

2. An air inflating system comprising an air pressure conduit adapted to connect to a source of air under pressure, a valve device having first and second chambers, first and second valve seats respectively adjacent said first and second chambers, a valve plunger movable to alternately engage said first and second valve seats for closing said first and second chambers, means providing for communication between said pressure conduit and said first chamber, a filling conduit adapted to alternately communicate with said chambers and being adapted to connect to an object to be inflated, a pressure release line communicating with said second chamber, a pressure release valve connected to said pressure release line, said pressure release valve being adapted to release air from the object during a predetermined pressure, a by-pass line connected to said pressure release line and said pressure conduit, a pressure regulator in said by-pass line, electrical means for actuating said valve for opening said first chamber for communication with said air filling line, and timing means for maintaining said valve in the open position with respect to said first chamber for a predetermined period, said valve being movable to close said first chamber and to open said second chamber to provide for communication with said air filling line and said pressure release line whereby excess pressure in said object may be relieved through said pressure release valve, said pressure regulator being adapted to direct air from the pressure conduit to said by-pass line and through said air filling line until a predetermined pressure is reached in said object.

3. An air inflating system comprising an air pressure conduit adapted to connect to a source of air under pressure, a valve device having first and second chambers, first and second valve seats respectively adjacent said first and second chambers, a valve plunger movable to alternately engage said first and second valve seats for closing said first and second chambers, means providing for communication between said pressure conduit and said first chamber, a filling conduit adapted to alternately communicate with said chambers and being adapted to connect to an object to be inflated, a pressure release line communication with said second chamber, a pressure release valve connected to said pressure release line, said pressure release valve being adapted to release air from the object during a predetermined pressure, electrical means for actuating said valve for opening said first chamber for communication with said air filling line, and timing means for maintaining said valve in the open position with respect to said first chamber for a predetermined period, said valve being movable to close said first chamber and to open said second chamber to provide for communication with said air filling line and said pressure release line, whereby excess pressure in said object may be relieved through said pressure release valve.

4. An air inflating system comprising an air pressure conduit adapted to connect to a source of air under pressure, a valve device having first and second chambers, first and second valve seats respectively adjacent said first and second chambers, a valve plunger movable to alternately engage said first and second valve seats for closing said first and second chambers, means providing for communication between said pressure conduit and said first chamber, a filling conduit adapted to alternately communicate with said chambers and being adapted to connect to an object to be inflated, a pressure release line communication with said second chamber, a pressure release valve connected to said pressure release line, said pressure release valve being adapted to release air from the object during a predetermined pressure, a by-pass line connected to said pressure release line and said pressure conduit, a pressure regulator in said by-pass line, means for moving said valve to open said first chamber to provide for communication between said first chamber and said air filling line, said means being operable after a predetermined time delay to move said valve to close said first chamber and to open said second chamber to provide for communication with said air filling line and said pressure release line, whereby excess pressure in said object may be relieved through said pressure release valve, said pressure regulator being adapted to direct air from the pressure conduit to said by-pass line and through said air filling line until a predetermined pressure is reached in said object.

5. An air inflating system comprising an air pressure conduit adapted to connect to a source of air under pressure, a valve device having first and second chambers, first and second valve seats respectively adjacent said first and second chambers, a valve plunger movable to alternately engage said first and second valve seats for closing said first and second chambers, means providing for communication between said pressure conduit and said first chamber, a filling conduit adapted to alternately communicate with said chambers and being adapted to connect to an object to be inflated, a pressure release line communication with said second chamber, a pressure release valve connected to said pressure release line, said pressure release valve being adapted to release air from the object during a predetermined pressure, means for moving said valve to open said first chamber to provide for communication between said first chamber and said air filling line, said means being operable after a predetermined time delay to move said valve to close said first chamber and to open said second chamber to provide for communication with said air filling line and said pressure release line, whereby excess pressure in said object may be relieved through said pressure release valve.

6. An air inflating system comprising an air pressure conduit adapted to connect to a source of air under pressure, an air filling line adapted to be connected to an object to be inflated, pressure release means including a release valve adapted to release air from an inflated object during a predetermined pressure, a first valve means in communication with said air filling line and said pressure conduit, a second valve in communication with said air filling line and said pressure release valve, electrical timing means connected to said first valve means for moving the same to an open position whereby air travels from the pressure conduit to said air filling line for a predetermined timed period to inflate an object, and means responsive to said timing means for closing said first valve and opening said second valve at the termination of said period to direct air to the pressure release means to release overinflation in said tire through said pressure release valve.

7. An air inflating system in accordance with claim 6, including a pressure regulator connected to the pressure conduit and to the second valve and to the air filling line for directing air under pressure to an object to be inflated during the open position of said second valve in response to a lower pressure in said object to be inflated than the pressure necessary to actuate the pressure release valve.

References Cited in the file of this patent
UNITED STATES PATENTS 2,029,085     Sussin _____ Jan. 28, 1936